United States Patent
Mochizuki

(10) Patent No.: US 10,328,844 B2
(45) Date of Patent: Jun. 25, 2019

(54) VEHICLE LAMP

(71) Applicant: Koito Manufacturing Co., Ltd., Tokyo (JP)

(72) Inventor: Mitsuyuki Mochizuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 301 days.

(21) Appl. No.: 14/979,992

(22) Filed: Dec. 28, 2015

(65) Prior Publication Data

US 2016/0200238 A1 Jul. 14, 2016

(30) Foreign Application Priority Data

Jan. 14, 2015 (JP) .................... 2015-005406

(51) Int. Cl.
| | |
|---|---|
| *B60Q 1/08* | (2006.01) |
| *B60Q 1/14* | (2006.01) |
| *F21S 41/14* | (2018.01) |
| *F21S 41/147* | (2018.01) |
| *F21S 41/657* | (2018.01) |
| *F21S 41/663* | (2018.01) |
| *F21S 41/16* | (2018.01) |

(52) U.S. Cl.
CPC .............. *B60Q 1/08* (2013.01); *B60Q 1/143* (2013.01); *F21S 41/14* (2018.01); *F21S 41/147* (2018.01); *F21S 41/16* (2018.01); *F21S 41/657* (2018.01); *F21S 41/663* (2018.01); *B60Q 2300/056* (2013.01); *B60Q 2300/112* (2013.01); *B60Q 2300/32* (2013.01); *B60Q 2300/322* (2013.01); *B60Q 2300/332* (2013.01); *B60Q 2300/41* (2013.01); *B60Q 2300/42* (2013.01)

(58) Field of Classification Search
CPC ................................... B60Q 1/2607
USPC ................... 362/510, 538, 539, 543–545
See application file for complete search history.

(56) References Cited

U.S. PATENT DOCUMENTS

2007/0147055 A1 6/2007 Komatsu
2014/0112012 A1* 4/2014 Nakazato ............. F21S 48/1159
362/510

FOREIGN PATENT DOCUMENTS

| CN | 102901017 A | 1/2013 |
|---|---|---|
| JP | 2010-140661 A | 6/2010 |

(Continued)

OTHER PUBLICATIONS

An Office Action dated Sep. 5, 2017, issued from the Chinese State Intellectual Property Office of the P.R.C (SIPO) of Chinese Patent Application No. 201610024339.4 and an EN translation thereof.

(Continued)

*Primary Examiner* — William J Carter
(74) *Attorney, Agent, or Firm* — Abelman, Frayne & Schwab

(57) ABSTRACT

Disclosed is a vehicle lamp a pair of lamp modules configured to irradiate light to form a pair of left and right light distribution patterns. Each of the lamp modules includes first and second lamp units. Further, irradiation light from the first lamp unit forms a first light distribution pattern having a vertically extending cutoff line at a center side of a pair of left and right distribution patterns, and irradiation light from the second lamp unit forms a second light distribution pattern near the cutoff line. The second light distribution pattern is smaller and brighter than the first light distribution pattern.

12 Claims, 6 Drawing Sheets

(56) References Cited

FOREIGN PATENT DOCUMENTS

| JP | 2012-243727 A | 12/2012 |
| JP | 2014-034360 A | 2/2014 |
| JP | 2014-078476 A | 5/2014 |

OTHER PUBLICATIONS

An Office Action dated Oct. 4, 2018, issued from the Japanese Patent Office (JPO) of Japanese Patent Application No. 2015-005406 and a Machine translation thereof.
France Search Report dated Jul. 26, 2018, issued from the Institut National De La Proprite Industerielle (INPI) of France Patent Application No. 1650263.

* cited by examiner

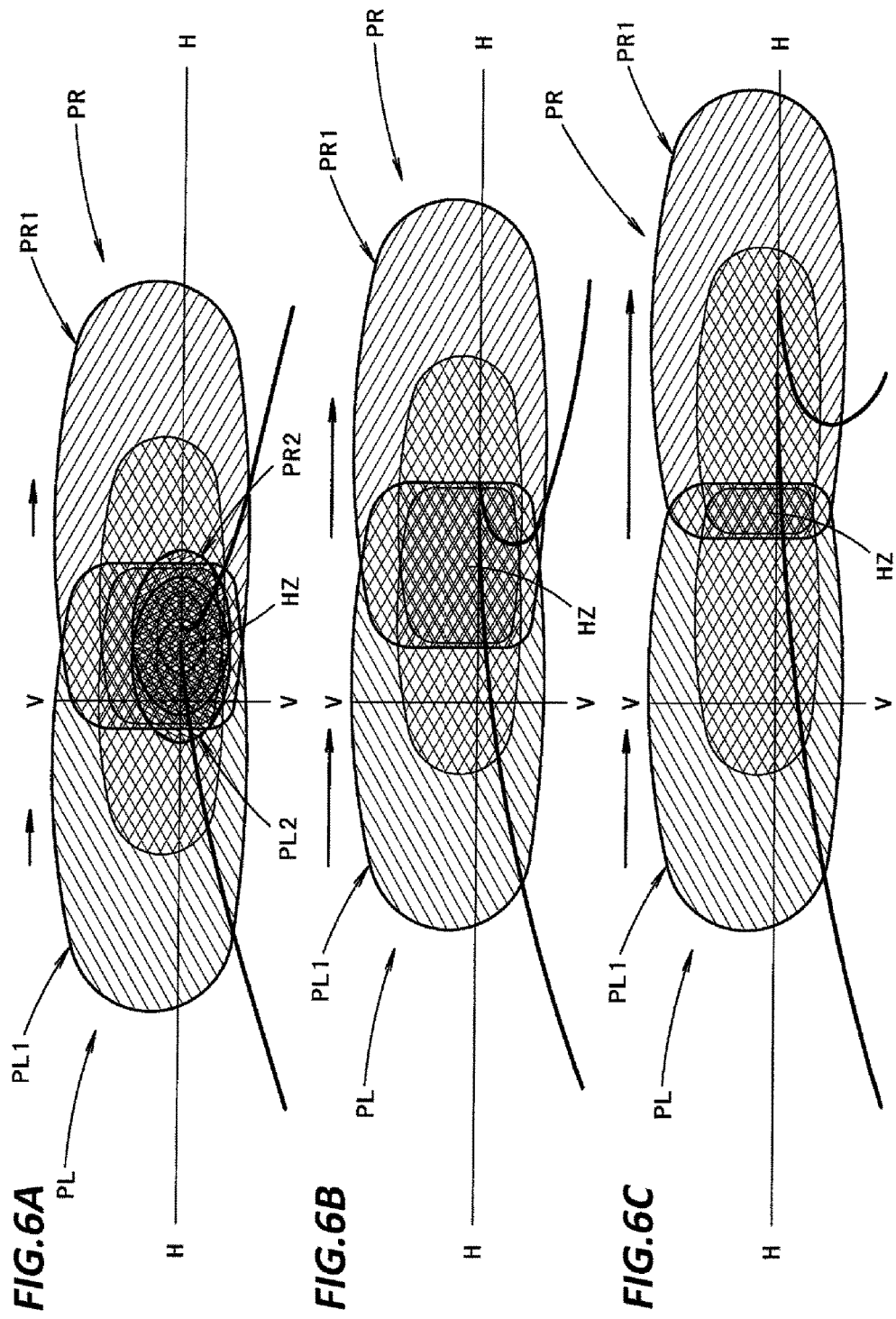

VEHICLE LAMP

CROSS-REFERENCE TO RELATED APPLICATIONS

This application is based on and claims priority from Japanese Patent Application No. 2015-005406 filed on Jan. 14, 2015, with the Japan Patent Office, the disclosure of which is incorporated herein in its entirety by reference.

TECHNICAL FIELD

The present disclosure relates to a vehicle lamp that is configured to form a pair of left and right light distribution patterns by irradiation light from a pair of lamp modules.

BACKGROUND

Conventionally, a configuration in which a pair of left and right light distribution patterns are formed by irradiation light from a pair of lamp modules has been known as a configuration of a vehicle lamp.

Japanese Patent Laid-Open Publication No. 2010-140661 discloses such a lamp for a vehicle is disclosed, in which each lamp module is configured to be rotatable leftward and rightward.

SUMMARY

A pair of left and right light distribution patterns may be integrally or separately formed by using the vehicle lamp disclosed in Japanese Patent Laid-Open Publication No. 2010-140661.

When the pair of left and right light distribution patterns are made to partially overlap with each other while being integrally formed by the vehicle lamp, the brightness in the overlapping portions may be increased, but the maximum luminous intensity thereof may not be sufficiently increased. In addition, in a case where the pair of left and right light distribution patterns are separately formed, the brightness of a side end portion of each light distribution pattern near the center of the left and right light distribution patterns may not be sufficiently ensured. Therefore, there is a room for improvement in sufficiently increasing a forward visibility of the driver of the own vehicle.

In consideration of the above problems, an object of the present disclosure is to provide a lamp for a vehicle ("vehicle lamp"), which is configured to form a pair of left and right light distribution patterns by irradiation light from a pair of lamp modules which are rotatable leftward and rightward, thereby sufficiently increasing a forward visibility of a driver in the own vehicle.

The present disclosure achieves the above-described object by configuring, each lamp module to include two lamp units and then devising the configurations of the two lamp units.

That is, according to the present disclosure, there is provided a vehicle lamp including a pair of lamp modules configured to irradiate light to form a pair of left and right light distribution patterns. Each of the lamp modules includes first and second lamp units, and is configured to form each of the light distribution patterns as a synthesized light distribution pattern of first and second light distribution patterns formed by irradiation light from the first and second lamp units. The first lamp unit is configured to form the first light distribution pattern having a vertically extending cutoff line at a center side of the pair of left and right light distribution patterns, and the second lamp unit is configured to form the second light distribution pattern near the cutoff line, the second light distribution pattern being smaller and brighter than the first light distribution pattern. Each of the lamp modules is configured to be rotatable in a left-to-right direction.

The "pair of left and right light distribution patterns" may form light distribution patterns for high beams, or may form additional light distribution patterns to be added to light distribution patterns for low beams when forming light distribution patterns for high beams, in themselves.

The positional relationship between the "pair of lamp units" is not particularly limited. For example, a configuration in which the lamp units are vertically stacked in two stages, or a configuration in which the lamp units are horizontally arranged side by side may be employed.

The "vertically extending cutoff line" does not necessarily extend in the vertical direction, and may extend in a direction that is inclined in relation to the vertical direction.

As illustrated in the above-described configuration, the vehicle lamp for according to the present disclosure includes a pair of lamp modules to form a pair of left and right light distribution patterns and the respective lamp modules are configured to be rotatable leftward and rightward. Therefore, the pair of left and right light distribution patterns may be formed integrally or separately. At that time, by moving the pair of left and right light distribution patterns leftward and rightward to be aligned with the position of a foregoing vehicle or an oncoming vehicle in a state where the pair of left and right light distribution patterns are separated from each other, the forward visibility of the driver of the own vehicle may be secured without giving glare to, for example, the driver of the foregoing vehicle or the oncoming vehicle. In addition, when the pair of left and right light distribution patterns are caused to partially overlap with each other when they are formed integrally, the brightness of the overlapping portions may increase.

In addition, each lamp module includes first and second lamp units, and is configured to form a first light distribution pattern having a vertically extending cutoff line at the center side of the pair of left and right light distribution patterns by irradiation light from the first lamp unit, and to form a second light distribution pattern, which is smaller and brighter than the first light distribution pattern, near the cutoff line by irradiation light from the second lamp unit. Therefore, the following acting effects may be obtained.

That is, each of the light distribution patterns may be formed as a synthesized light distribution pattern of the first light distribution pattern and the second light distribution pattern which is located near the cutoff line and is small and bright. As a result, a high luminous intensity area may be formed near the cutoff line.

Accordingly, when the pair of left and right light distribution patterns are integrally formed, the brightness of the overlapping portions may be greatly enhanced so that the maximum luminous intensity thereof may be sufficiently enhanced. In addition, even in the case where the pair of left and right light distribution patterns are formed separately, the brightness of the side end portion of each light distribution pattern near the center of the left and right light distribution patterns may be sufficiently secured. Also, due to this, the forward visibility of the driver of the own vehicle may be sufficiently improved.

According to the present disclosure described above, in the vehicle lamp which is configured to form a pair of left and right light distribution patterns by irradiation light from the pair of lamp modules which are rotatable leftward and rightward, the forward visibility of the driver of the vehicle may be sufficiently improved.

In the configuration described above, when the first lamp unit is configured to form the first light distribution pattern as a light distribution pattern having a maximum luminous intensity near the cutoff line, the following acting effects may be obtained.

That is, when the pair of left and right light distribution patterns are integrally formed in the state where the pair of left and right distribution patterns are caused to partially overlap with each other, the brightness in the overlapping portions may be further enhanced. In addition, when the pair of left and right light distribution patterns is separately formed, the brightness of the side end portion of each light distribution pattern near the center of the left and right light distribution patterns may be further enhanced.

In the configuration described above, when the second lamp unit is configured to form the second light distribution pattern near a lower end edge of the first light distribution pattern, a short distance area of a traveling road in front of the vehicle may be suppressed from being excessively brightened, and then the further visibility of the driver of the own vehicle may be sufficiently improved.

In the configuration described above, when a light emitting diode is used as a light source of the first lamp unit and a laser diode is used as a light source of the second lamp unit, the second light distribution pattern may be easily formed as a smaller and brighter light distribution pattern than the first light distribution pattern.

In the configuration described above, when each of the lamp modules is configured such that the first lamp unit and the second lamp unit are individually turned ON, the shapes of the pair of left and right light distribution patterns may be appropriately changed according to a vehicle traveling state, and thus the forward visibility of the driver of the own vehicle may be further improved.

The above-described summary is illustration purposes only and does not intend to limit in any ways. In addition to the illustrative embodiment, examples, and features described above, additional embodiment, example, and features will become apparent by referring to the drawings and the following detailed description.

BRIEF DESCRIPTION OF THE DRAWINGS

FIGS. 6A to 6C are views isometrically illustrating the light distribution patterns (Part 3).

DETAILED DESCRIPTION

In the following detailed description, reference is made to the accompanying drawing, which form a part hereof. The illustrative exemplary embodiments described in the detailed description, drawings, and claims are not meant to be limiting. Other exemplary embodiments may be utilized, and other changes may be made, without departing from the spirit or scope of the subject matter presented here.

Figure 1:
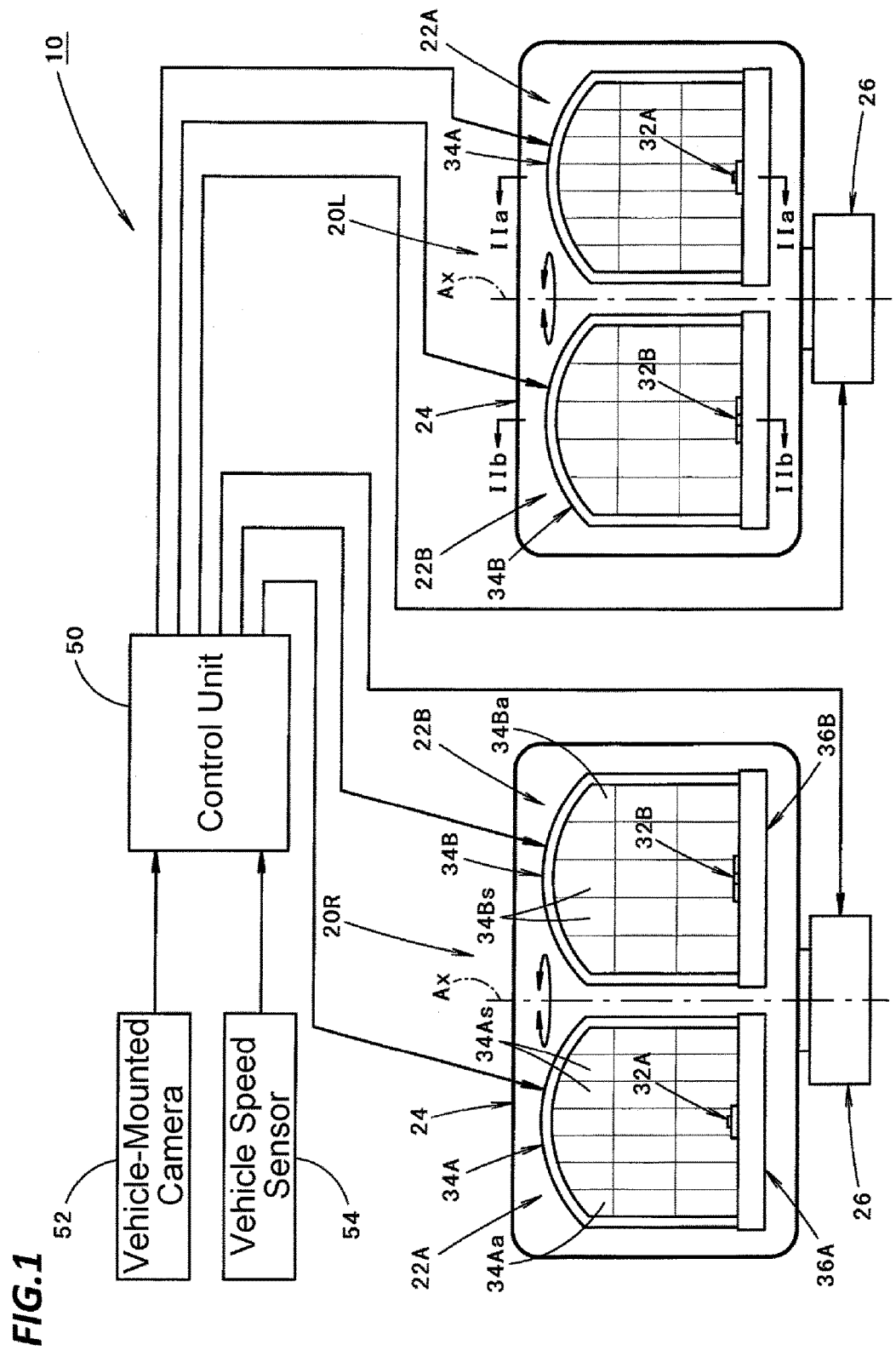
FIG. 1 is a front view illustrating a vehicle lamp according to an exemplary embodiment of the present disclosure.

FIG. 1 is a front view illustrating a vehicle lamp 10 according to an exemplary embodiment of the present disclosure.

As illustrated in FIG. 1, the vehicle lamp 10 according to the present exemplary embodiment includes a pair of left and right lamp modules 20L, 20R, a control unit 50, a vehicle-mounted camera 52 to capture an image of a scene in front of the vehicle, and a vehicle speed sensor 54.

The pair of left and right lamp modules 20L, 20R are lamp modules disposed at left and right sides of the front end portion of the vehicle, respectively, and arranged in a bilaterally symmetrical configuration. Each of the lamp modules 20L, 20R is accommodated in a lamp chamber defined by a lamp body and a light transmitting cover which are not illustrated.

Each of the lamp modules 20L, 20R includes first and second lamp units 22A, 22B arranged in parallel to each other at left and right sides, a support frame 24 to support the lamp units, and a rotating mechanism 26 to rotate the first and second lamp units 22A, 22B, along with the support frame 24, leftward and rightward around a vertical axis Ax.

An image data signal captured by the vehicle-mounted camera 52 and a vehicle speed signal from the vehicle speed sensor 54 are input to the control unit 50. In addition, based on the input signals, the control unit 50 performs a driving control of the rotating mechanism 26, and individually performs an ON/OFF control of the first and second lamp units 22A, 22B of each of the lamp modules 20L, 20R.

Because the pair of left and right lamp modules 20L, 20R are arranged in a bilaterally symmetrical configuration as described above, the following description will be made on a configuration of the first and second lamp units 22A, 22B of the lamp module 20L at the left side (i.e. the right side when viewed in front view the vehicle lamp).

Figure 2A:
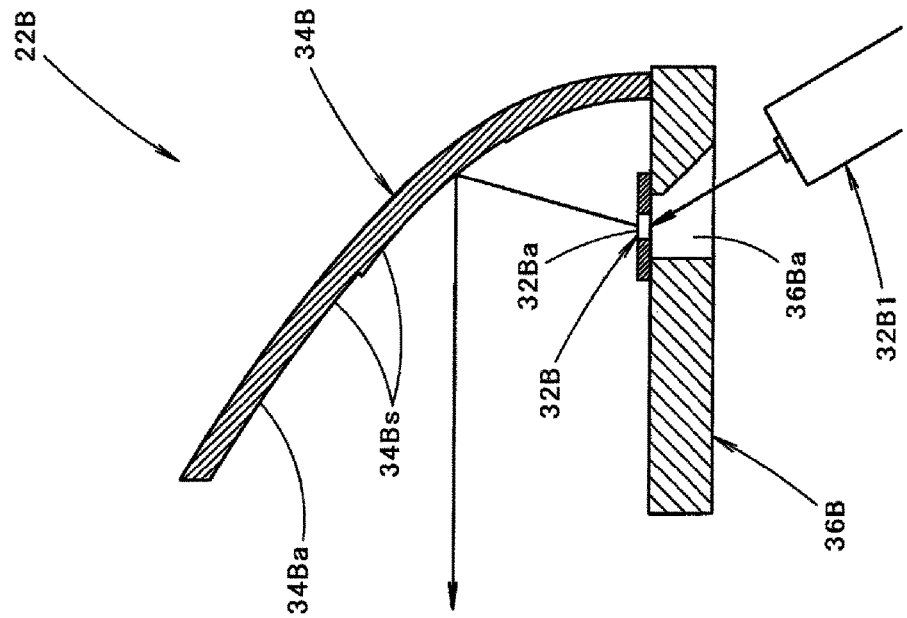
FIG. 2A is a sectional view taken along line IIa-IIa of FIG. 1.
Figure 2B:
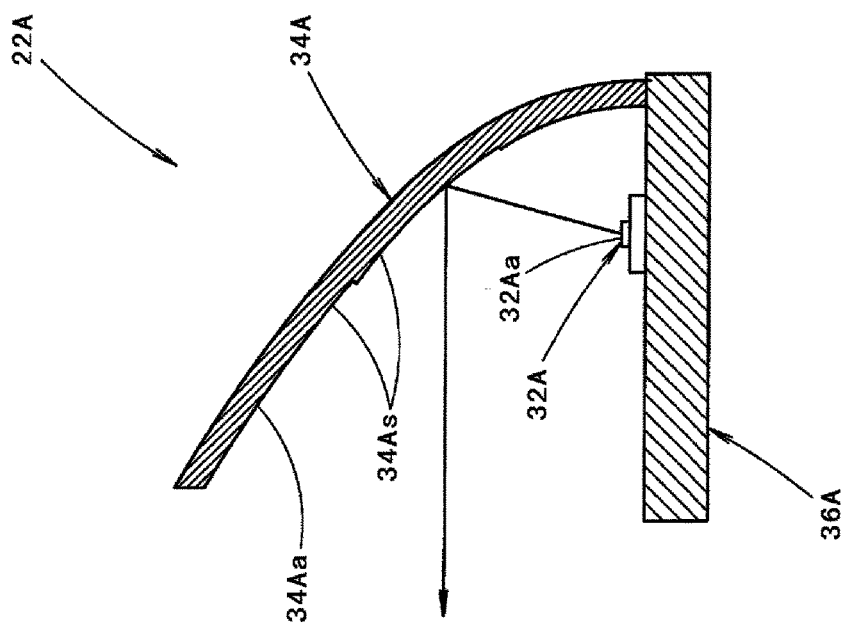
FIG. 2B is a sectional view taken along line IIb-IIb of FIG. 1.

FIG. 2A is a sectional view taken along line IIa-IIa of FIG. 1, and FIG. 2B is a sectional view taken along line IIb-IIb of FIG. 1.

As illustrated in FIGS. 2A and 2B, both the first and second lamp units 22A, 22B are configured as parabolic lamp units.

That is, the first lamp unit 22A includes a light source 32A, a reflector 34A that reflects light emitted from the light source 32A forward, and a base member 36A that supports the light source and the reflector.

In the first lamp unit 22A, a white light emitting diode is used as the light source 32A. That is, the light source 32A is configured by a light emitting chip of the white light emitting diode, and a light emitting surface 32Aa thereof is arranged to face upward.

The reflector 34A is arranged to cover the light source 32A from the upper side, and a reflective surface 34Aa thereof is constituted with a plurality of reflective elements 34As. In addition, the light from the light source 32A is reflected and controlled by the respective reflective elements 34As.

The base member 36A is configured as a plate-shaped member that extends along a horizontal plane.

Meanwhile, the second lamp unit 22B includes a light source 32B, a reflector 34B that reflects light emitted from the light source 32B forward, and a base member 36B that supports the light source 34B and the reflector 32B.

In the second lamp unit 22B, a laser diode is used as the light source 32B. That is, the light source 32B is formed of a fluorescent body which emits white light by the laser light irradiated from the laser diode 32B1, and a light emitting surface 32Ba thereof is arranged to face upward.

The reflector 34B is arranged to cover the light source 32A from the upper side, and a reflective surface 34Ba thereof is constituted with a plurality of reflective elements 34Bs. In addition, light from the light source 32B is reflected and controlled by the respective reflective elements 34Bs.

The base member 36B is configured as a plate-shaped member that extends along a horizontal plane. In the base member 36B, an opening 36Ba is formed to irradiate the laser light from the laser diode 32B 1 to the light source 32B.

FIGS. 3A and 3B, FIGS. 5A and 5B, and FIGS. 6A and 6B are views isometrically illustrating a pair of left and right light distribution patterns PL, PR that are formed on a virtual vertical screen located at a position 25m ahead of the vehicle by light irradiated forward from the vehicle lamp 10 according to the present exemplary embodiment.

Figure 3A:
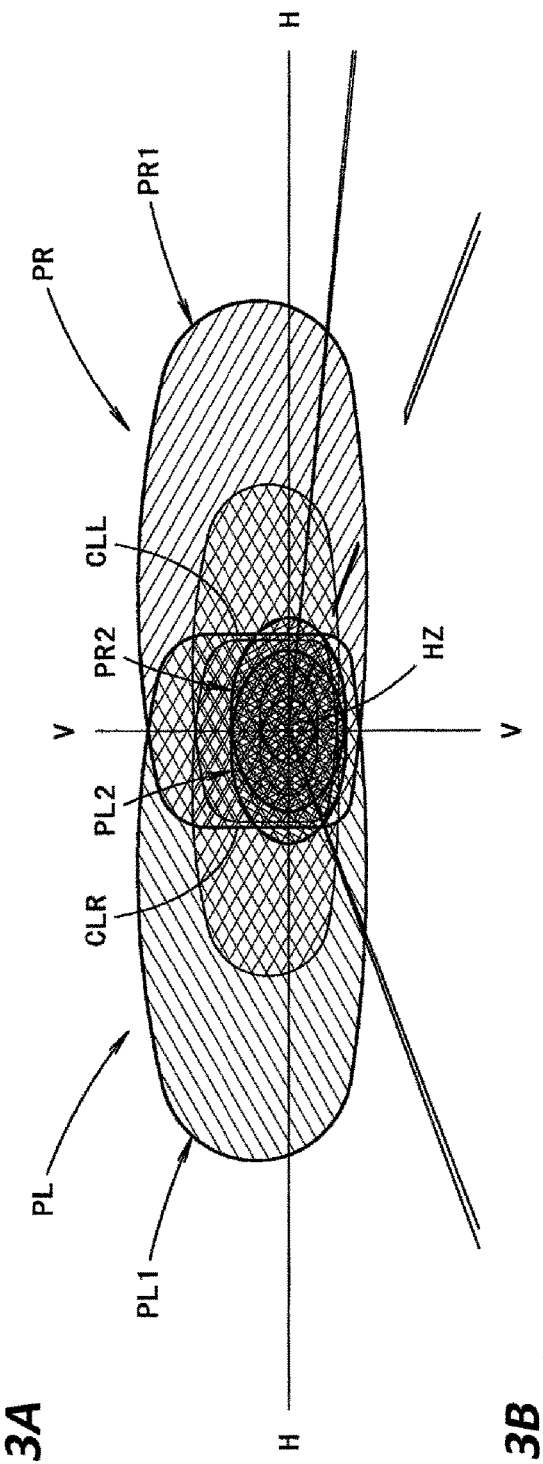
FIGS. 3A and 3B are views isometrically illustrating a pair of left and right light distribution patterns formed by irradiation light from the vehicle lamp, respectively (Part 1).

The pair of left and right light distribution patterns PL, PR illustrated in FIG. 3A are light distribution patterns formed in a state where the respective lamp modules 20L, 20R are directed to the front side of the vehicle (i.e. in a state where the rotating mechanisms 26 are not driven) (hereinafter, referred to as a "standard state") and also in a state where both the first and second lamp units 22A, 22B of the respective lamp modules 20L, 20R are turned ON. The light distribution patterns are adapted to function as light distribution patterns for high beams.

The left light distribution pattern PL is a light distribution pattern formed by irradiation light from the left lamp module 20L, and is formed as a synthesized light distribution pattern of a first light distribution pattern PL1 formed by irradiation light from the first lamp unit 22A and a second light distribution pattern PL2 formed by irradiation light from the second lamp unit 22B.

Meanwhile, the right light distribution pattern PR is a light distribution pattern formed by irradiation light from the right lamp module 20R, and is formed as a synthesized light distribution pattern of a first light distribution pattern PR1 formed by irradiation light from the first lamp unit 22A and a second light distribution pattern PR2 formed by irradiation light from the second lamp unit 22B.

Figure 3B:
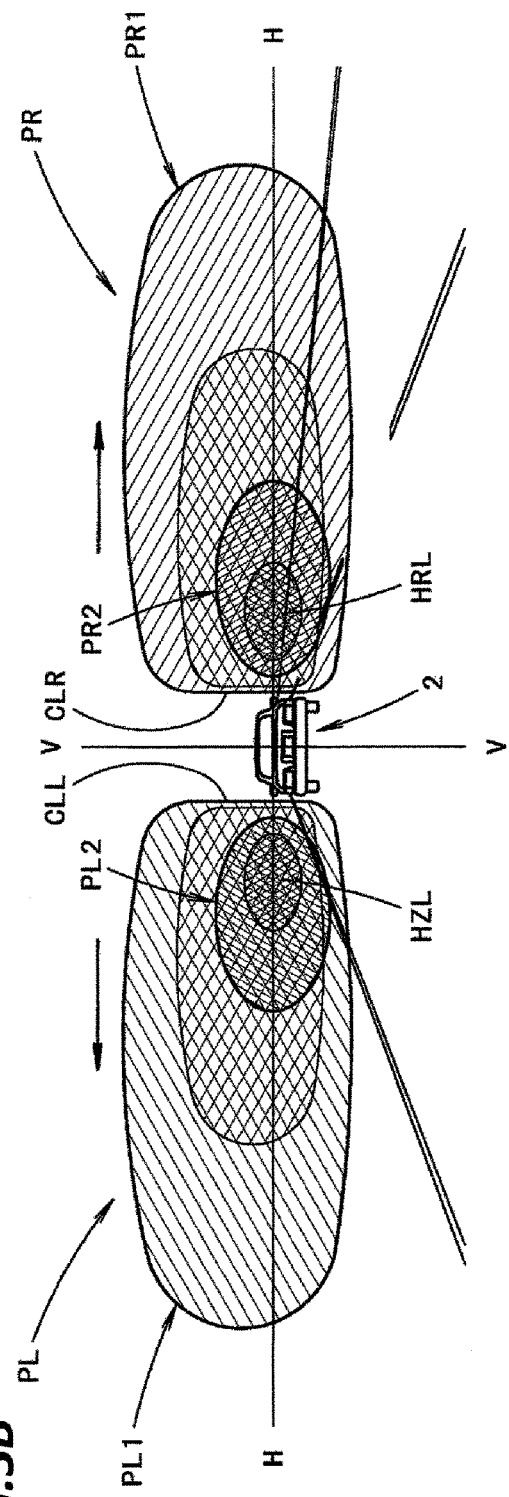

FIGS. 4A to 4D are views illustrating the pair of left and right light distribution patterns illustrated in FIGS. 3A and 3B, respectively, in the state where each of the pair of left and right distribution patterns is separated into a first light distribution pattern PL1, PR1 and a second light distribution pattern PL2, PR2 that constitute the corresponding light distribution pattern.

Figure 4A:
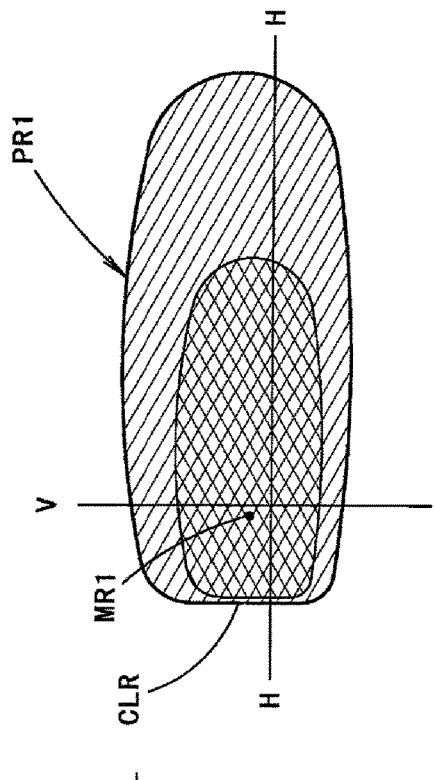
FIGS. 4A to 4D are views illustrating the pair of left and right light distribution patterns, respectively, in the state where each of the pair of left and right distribution patterns is separated into a first light distribution pattern and a second light distribution pattern that constitute the corresponding light distribution pattern.

The first light distribution pattern PL1 illustrated in FIG. 4A is formed as a horizontally long light distribution pattern, which is slightly widened rightward and largely widened leftward with respect to a vertical line V-V that passes through a vanishing point H-V in the front direction of the vehicle lamp.

A right end edge of the first light distribution pattern PL1 (i.e. the end edge at the center side of left and right light distribution patterns) is formed as a vertically extending cutoff line CLL. At that time, the cutoff line CLL is formed to extend in the vertical direction.

In the vertical direction, the first light distribution pattern PL1 is formed to be widened more largely at the upper side than at the lower side with respect to the horizontal line H-H that passes through the vanish point H-V.

The first light distribution pattern PL1 has the maximum luminous intensity ML1 near the cutoff line CLL. More specifically, the position of the maximum luminous intensity ML1 is set to a position shifted slightly rightward and slightly upward with respect to H-V.

Figure 4C:
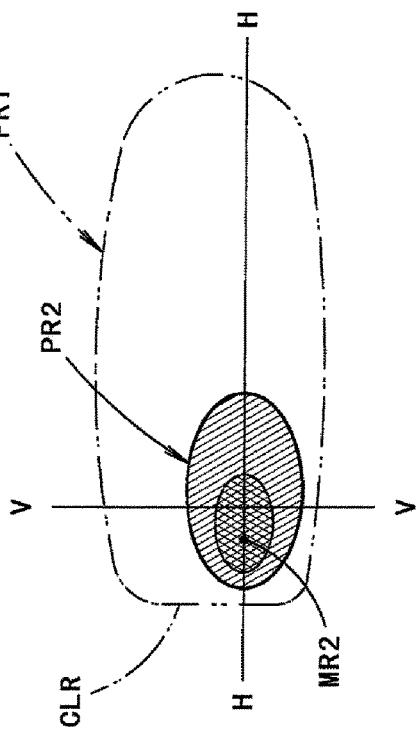
Figure 4B:
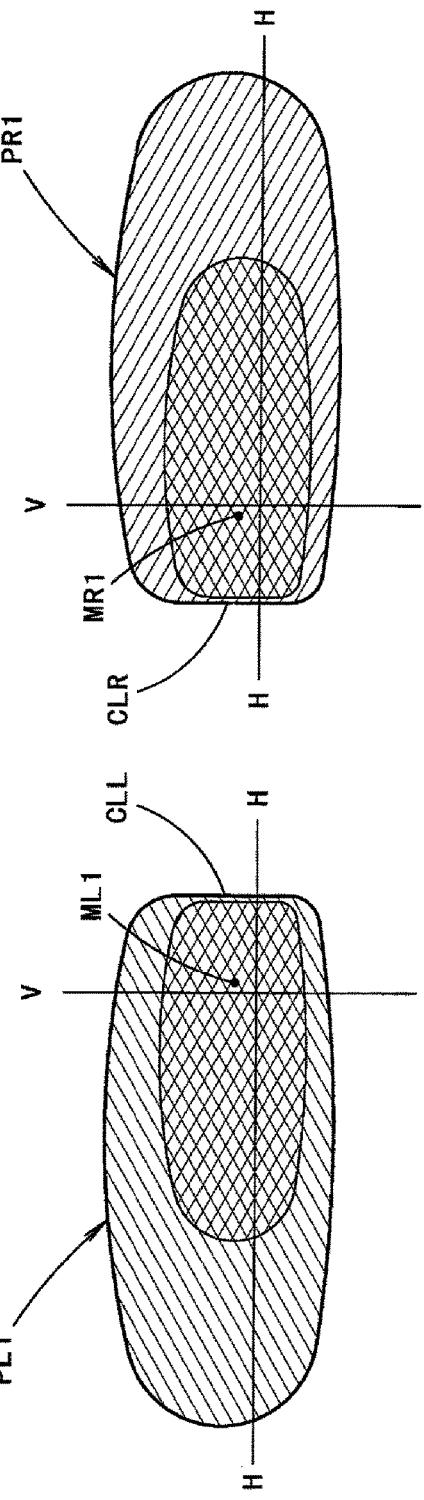

The second light distribution pattern PL2 illustrated in FIG. 4B is a smaller and brighter light distribution pattern than the first light distribution pattern PL1, and is formed near the cutoff line CLL.

At that time, the second light distribution pattern PL2 is a slightly horizontally lengthened spot-shaped light distribution pattern. In a positional relationship of being included within the first light distribution pattern PL1, the second light distribution pattern PL2 is formed near the lower end edge of the first light distribution pattern PL1.

More specifically, the center position of the second light distribution pattern PL2 is set to a position slightly shifted to the left with respect to H-V, and the position of the maximum luminous intensity ML2 of the second light distribution pattern is set to a position slightly shifted to the right with respect to H-V.

The second light distribution pattern PL2 is formed as a very bright light distribution pattern because a laser diode is used as the light source 32B of the second lamp unit 22B.

The first light distribution pattern PR1 illustrated in FIG. 4C is formed to be bilaterally symmetrical to the first light distribution pattern PL1 with reference to line V-V in terms of shape and luminous intensity distribution.

That is, the left end edge of the first light distribution pattern PR1 is formed as a vertically extending cutoff line CLR, and the maximum luminous intensity MR1 of the first light distribution pattern PR1 is formed near the cutoff line CLR.

Figure 4D:
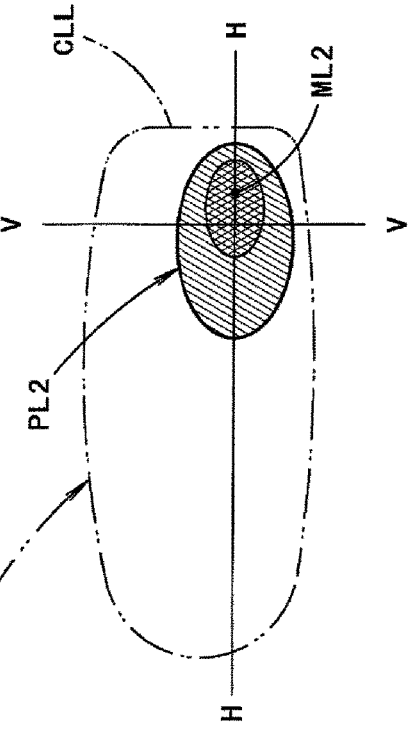

The second light distribution pattern PR2 illustrated in FIG. 4D is formed to be bilaterally symmetrical to the second light distribution pattern PL2 with reference to line V-V in terms of shape and luminous intensity distribution.

That is, the second light distribution pattern PR2 is a smaller and brighter light distribution pattern than the first light distribution pattern PR1, and is formed near the lower end edge of the first light distribution pattern PR1 and near the cutoff line CLR of the first light distribution pattern PR1, and the position of the maximum luminous intensity MR2 is set to a position slightly shifted to the left with respect to H-V.

As illustrated in FIG. 3A, the pair of left and right light distribution patterns PL, PR are formed to partially overlap with each other to some extent from the standard state.

The pair of left and right light distribution patterns PL, PR are formed as horizontally long light distribution patterns, which are generally widened to left and right sides with reference to the line V-V.

At that time, in the vertical direction, the pair of left and right light distribution patterns PL, PR are formed to be more largely widened at the upper side than at the lower side with respect to the horizontal line H-H. The hot zones (i.e., the high luminous intensity area) thereof are formed as very high luminous intensity areas of which the centers are located at H-V. This is because the maximum luminous intensities ML1, MR1 of the respective first light distribution patterns PL1, PR1 are located near the line V-V, and the respective second light distribution patterns PL2, PR2, which are small and bright, are located near H-V.

When the pair of left and right light distribution patterns PL, PR are formed as illustrated in FIG. 3A, the forward visibility of the driver of the own vehicle may be sufficiently increased when the own vehicle travels straight at a high speed.

A pair of left and right light distribution patterns PL, PR illustrated in FIG. 3B are light distribution patterns formed when the respective lamp modules 20R and 20R are rotated by a predetermined amount in a direction in which the lamp modules are moved away from each other in left and right directions from the standard state. In reference to the pair of left and right light distribution patterns PL, PR illustrated in FIG. 3A, the left light distribution pattern PL is moved leftward, and the right light distribution pattern PR is moved rightward. At that time, the cutoff line CLL of the left light distribution pattern PL is located at the left side of the line V-V, and the cutoff line CLR of the right light distribution pattern PR is located at the right side of the line V-V.

By forming the pair of left and right light distribution patterns PL, PR illustrated in FIG. 3B, even if a foregoing vehicle 2 exists, it is possible to irradiate areas on the left and right of the pair of cutoff lines CLL, CLR without giving glare to the driver of the foregoing vehicle 2 by locating the pair of cutoff lines CLL, CLR on the left and right of the foregoing vehicle 2. In this way, the front area visibility of the driver of the own vehicle may be improved. At that time, the respective light distribution patterns PL, PR brightly irradiate areas on the left and right of the pair of cutoff lines CLL, CLR because they have hot zones HZL, HZR near the cutoff lines CLL, CLR.

In addition, by changing the distance between the cutoff lines CLL, CLR depending on the distance between the own vehicle and the foregoing vehicle 2, the forward visibility of the driver of the own vehicle may be improved to the maximum extent without giving glare to the driver of the foregoing vehicle 2.

Meanwhile, position detection of the foregoing vehicle 2 is performed as the control unit 50 calculates, for example, the width and the center position of the foregoing vehicle 2 based on the image data of the foregoing vehicle 2 which is input from the vehicle-mounted camera 52. In addition, the control unit 50 is adapted to locate the cutoff lines CLL, CLR near the opposite sides of the foregoing vehicle 2 by driving the rotating mechanisms 26 of the respective lamp modules 20L, 20R based on the position detection result. Meanwhile, the same control is performed even in a case where an oncoming vehicle exists.

Figures 5A, 5B:
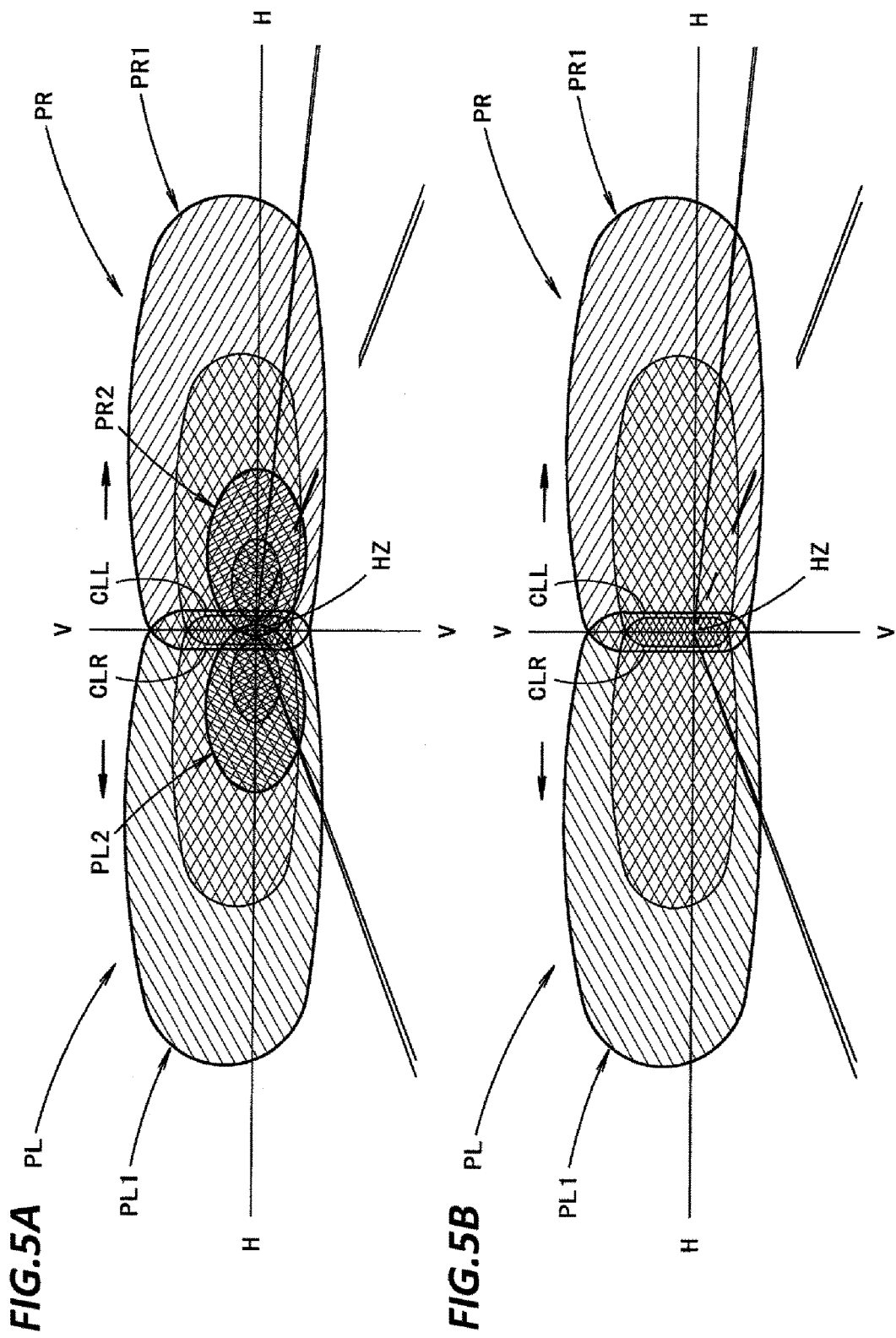
FIGS. 5A and 5B are views isometrically illustrating the light distribution patterns (Part 2).

A pair of left and right light distribution patterns PL, PR illustrated in FIG. 5A are light distribution patterns that are formed when the respective lamp modules 20L, 20R are slightly rotated in the direction in which the lamp modules 20L, 20R are moved away from each other in the left and right directions from the standard state. As compared to the pair of left and right light distribution patterns illustrated in FIG. 3A, the left light distribution pattern PL is slightly moved leftward, and the right light distribution pattern PR is slightly moved rightward. At that time, the left light distribution pattern PL is slightly shifted to the right with respect the line V-V, and the right light distribution pattern PR is slightly shifted to the left with respect to the line V-V. In this way, the pair of left and right light distribution patterns PL, PR are formed to slightly overlap with each other.

In the pair of left and right light distribution patterns PL, PR illustrated in FIG. 5A, the brightness of the hot zone HZ thereof is reduced, but the transverse width of the hot zone HZ may be increased because the overlapping range therebetween is narrow. In addition, the horizontal width of the pair of left and right light distribution patterns PL, PR may also be increased.

The pair of left and right light distribution patterns PL, PR illustrated in FIG. 5A are especially suitable for a case where the vehicle travels at a low speed on a suburban road.

The pair of left and right light distribution patterns PL, PR illustrated in FIG. 5B are light distribution patterns obtained by omitting the second light distribution patterns PL2, PR2 from the pair of left and right light distribution patterns PL, PR illustrated in FIG. 5A, respectively. The left and right distribution patterns PL, PR of FIG. 5B are formed by turning OFF the second lamp units 22B of the respective lamp modules 20L, 20R.

In the pair of left and right light distribution patterns PL, PR illustrated in FIG. 5B, the brightness of the hot zone is further reduced compared to the pair of left and right light distribution patterns P1 and PR illustrated in FIG. 5A. However, the whole horizontal width of the pair of left and right light distribution patterns PL, PR illustrated in FIG. 5B is maintained high.

The pair of left and right light distribution patterns PL, PR illustrated in FIG. 5B are especially suitable, for example, for a case where the vehicle travels at a low speed on an urban road.

The pair of left and right light distribution patterns PL, PR illustrated in FIG. 6A are light distribution patterns formed when the respective lamp modules 20L, 20R are slightly rotated rightward from the standard state, and are obtained by slightly moving the pair of left and right light distribution patterns PL, PR illustrated in FIG. 3A rightward in parallel to each other.

The pair of left and right light distribution patterns PL, PR illustrated in FIG. 6A are especially suitable, for example, for a case where the vehicle travels at a high speed on a gentle curve.

The pair of left and right light distribution patterns PL, PR illustrated in FIG. 6B are light distribution patterns formed by additionally moving the pair of left and right light distribution patterns PL, PR illustrated in FIG. 6A rightward in parallel to each other, and then omitting the second light distribution patterns PL2, PR2. That is, the pair of left and right distribution patterns PL, PR illustrated in FIG. 6B are light distribution patterns formed by additionally rotating the respective lamp modules 20L, 20R rightward, and then turning OFF the second lamp units 22B of the respective lamp modules 20L, 20R.

The pair of left and right light distribution patterns PL, PR illustrated in FIG. 6B are especially suitable, for example, for a case where the vehicle travels at a low speed around a relatively sharp curve.

The pair of left and right light distribution patterns PL, PR illustrated in FIG. 6C are light distribution patterns formed by additionally moving the right light distribution pattern PR illustrated in FIG. 6B rightward within a range where the right light distribution pattern PR is not spaced apart from the left light distribution pattern PL illustrated in FIG. 6B. That is, the pair of left and right distribution patterns PL, PR illustrated in FIG. 6C are light distribution patterns formed by additionally rotating the right lamp module 20R rightward.

The pair of left and right light distribution patterns PL, PR illustrated in FIG. 6C are especially suitable, for example, for a case where the vehicle travels at a low speed around a sharp curve.

Subsequently, the acting effects of the present exemplary embodiment will be described.

Since the vehicle lamp 10 according to the present exemplary embodiment includes the pair of lamp modules 20L, 20R to form the pair of left and right light distribution patterns PL, PR, and the respective lamp modules 20L, 20R are configured to be rotatable leftward and rightward, the pair of left and right light distribution patterns PL, PR may be integrally or separately formed. At that time, in a state where the pair of left and right light distribution patterns PL, PR are separated from each other, the forward visibility of the driver of the own vehicle may be secured without giving glare to, for example, a driver of the foregoing vehicle 2 or the oncoming vehicle by moving the light distribution patterns PL, PR leftward and rightward to be aligned to the position of the foregoing vehicle 2 or the oncoming vehicle. In addition, when the pair of left and right light distribution patterns PL, PR are caused to partially overlap with each other while being integrally formed, the brightness may be enhanced in the partially overlapping portions thereof.

In addition, each of the lamp modules 20L, 20R includes the first and second lamp units 22A, 22B, and is configured to form the first light distribution patterns PL1, PR1 having the vertically extending cutoff lines CLL, CLR at the center side of the pair of left and right light distribution patterns PL, PR by irradiation light from the first lamp unit 22A, and to form the second light distribution patterns PL2, PR2, which are smaller and brighter than the first light distribution patterns PL1, PR1, near the cutoff lines CLL, CLR by irradiation light from the second lamp unit 22B. Therefore, the following acting effects may be obtained.

That is, each of the light distribution patterns PL, PR may be formed as a synthesized light distribution pattern of the first light distribution pattern PL1 or PR1 and the second light distribution pattern PL2 or PR2 which is small and bright and is located near the cutoff line CLL or CLR. Therefore, a high luminous intensity area near the cutoff line CLL or CLR.

Accordingly, when the pair of left and right light distribution patterns PL, PR are caused to partially overlap with each other while being integrally formed, the brightness in the overlapping portions may be greatly enhanced, and the maximum luminous intensity thereof may be sufficiently enhanced. In addition, even in a case where the pair of left and right light distribution patterns PL, PR are separately formed, the brightness at the side end portion of each light distribution pattern PL or PR near the center of the light distribution patterns PL, PR may be sufficiently secured. In this way, the forward visibility of the driver of the own vehicle may be sufficiently improved.

According to the present exemplary embodiment described above, in the vehicle lamp 10 which is configured to form the pair of left and right light distribution patterns PL, PR by irradiation light from the pair of lamp modules 20L, 20R which are rotatable leftward and rightward, the forward visibility of the driver of the own vehicle may be sufficiently improved.

In addition, in the present exemplary embodiment, the first lamp units 22A of the respective lamp modules 20L or 20R are configured to form the first light distribution patterns PL1, PR1 as light distribution patterns having the maximum luminous intensities ML1 and MR1 near the cutoff lines CLL, CLR. Therefore, the following acting effects may be obtained.

That is, when the pair of left and right light distribution patterns PL, PR are integrally formed in a state where they partially overlap with each other, the brightness in the overlapping portions may be further enhanced. In addition, when the pair of left and right light distribution patterns PL, PR are separately formed, the brightness of the side end portion of each light distribution pattern PL, PR near the center of the light distribution patterns PL, PR may be further enhanced.

In addition, in the present exemplary embodiment, the second lamp units 22B of the respective lamp modules 20L, 20R are configured to form the second light distribution patterns PL2, PR2 near the lower end edges of the first light distribution patterns PL1, PR1. Therefore, a short distance area of a traveling road in front of the vehicle may be made not to excessively brightened, and then the forward visibility of the driver of the own vehicle may be sufficiently improved.

In addition, in the present exemplary embodiment, a light emitting diode is used as the light source 32A of the first lamp unit 22A and a laser diode is used as the light source 32B of the second lamp unit 22B. Therefore, the second light distribution patterns PL2, PR2 may be easily formed to be smaller and brighter than the first light distribution patterns PL1, PR1.

In addition, in the present exemplary embodiment, the respective lamp modules 20L, 20R are configured such that the first lamp units 22A, 22B and the second lamp units 22A, 22B are individually turned ON. Therefore, the shapes of the pair of left and right light distribution patterns PL, PR may be appropriately changed according to a vehicle traveling situation. In this way, the forward visibility of the driver of the vehicle may be further improved.

In the exemplary embodiment described above, it has been described that the first and second lamp units 22A, 22B of the respective lamp modules 20L, 20R are configured as parabolic lamp units. However, any one lamp unit or both lamp units may be configured as other kinds of lamp units (e.g. projector type lamp units or rectangular lamp units).

In the exemplary embodiment described above, it has been described that a light emitting diode is used as the light source 32A of the first lamp unit 22A and a laser diode is used as the light source 32B of the second lamp unit 22B. However, other kinds of light sources may be employed.

In the exemplary embodiment, it has been described that the pair of lamp modules 20L, 20R are arranged at the left and right sides of the front end portion of the vehicle, respectively. However, other arrangements may be employed.

In the exemplary embodiment, it has been described that the vehicle-mounted camera 52 and the vehicle speed sensor 54 are connected to the control unit 50. However, a navigation device may be additionally connected to the control unit 50 so that navigation data may also be used to perform the driving control of the rotating mechanism 26 and the turn-on/turn-off control of the first and second lamp units 22A, 22B.

Meanwhile, in the exemplary embodiment, numerical values represented as specifications are merely examples, and these values may be appropriately set to other values.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicle lamp comprising:
   a pair of lamp modules configured to irradiate light to form a pair of left and right light distribution patterns, wherein each of the lamp modules includes first and second lamp units, and is configured to form each of the pair of left and right light distribution patterns as a synthesized light distribution pattern of a first and a second light distribution patterns formed by irradiating light from the first and second lamp units, respectively, the first lamp unit is configured to form the first light distribution pattern having a vertical cutoff line at a center side of the pair of left and right light distribution patterns, the second lamp unit is configured to form the second light distribution pattern in the first light distribution pattern and located near a lower edge of the first light distribution pattern toward near the vertical cutoff line of the first light distribution pattern, the second light distribution pattern being smaller and brighter than the first light distribution pattern, and each of the pair of lamp modules is configured to be rotatable in left and right directions about an axis passing through a central portion of each of the lamp modules when viewed from a top such that the pair of left and right light distribution patterns is integrally or separately formed, wherein the pair of lamp modules is rotated by a predetermined amount in a direction in which the pair of lamp modules is moved away from each other in left and right directions, thereby positioning the vertical cutoff line of the first light distribution pattern of the left light distribution pattern (CLL) and the vertical cutoff line of the first light distribution pattern of the right light distribution pattern (CLR) at a left side and a right side of a foregoing vehicle with reference to an own vehicle, respectively, and each of the pair of lamp modules is rotated such that a distance between the vertical cutoff line CLL and the vertical cutoff line CLR is changed depending on a distance between the foregoing vehicle and the own vehicle.

2. The lamp of claim 1, wherein the first lamp unit is configured to form the first light distribution pattern as a light distribution pattern having a maximum luminous intensity near the vertical cutoff line of the first light distribution pattern.

3. The lamp of claim 2, wherein the second lamp unit is configured to form the second light distribution pattern in the first light distribution pattern and near a lower end edge of the first light distribution pattern.

4. The lamp of claim 3, wherein a light emitting diode is used as a light source of the first lamp unit, and a laser diode is used as a light source of the second lamp unit.

5. The lamp of claim 2, wherein a light emitting diode is used as a light source of the first lamp unit, and a laser diode is used as a light source of the second lamp unit.

6. The lamp of claim 2, wherein each of the lamp modules is configured such that the first lamp unit and the second lamp unit are individually turned ON.

7. The lamp of claim 1, wherein the second lamp unit is configured to form the second light distribution pattern in the first light distribution pattern and near a lower end edge of the first light distribution pattern.

8. The lamp of claim 7, wherein a light emitting diode is used as a light source of the first lamp unit, and a laser diode is used as a light source of the second lamp unit.

9. The lamp of claim 7, wherein each of the lamp modules is configured such that the first lamp unit and the second lamp unit are individually turned ON.

10. The lamp of claim 1, wherein a light emitting diode is used as a light source of the first lamp unit, and a laser diode is used as a light source of the second lamp unit.

11. The lamp of claim 10, wherein each of the lamp modules is configured such that the first lamp unit and the second lamp unit are individually turned ON.

12. The lamp of claim 1, wherein each of the lamp modules is configured such that the first lamp unit and the second lamp unit are individually turned ON.

* * * * *